United States Patent
Daude et al.

(10) Patent No.: US 8,997,019 B2
(45) Date of Patent: Mar. 31, 2015

(54) METHOD AND PROCESS FOR REPRESENTING INFORMATION ON A DISPLAY DEVICE OF A VEHICLE

(75) Inventors: Rainer Daude, Freising (DE); Alexandre Saad, Eching (DE); Thorsten Schmitt, Ottobrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 364 days.

(21) Appl. No.: 13/524,219

(22) Filed: Jun. 15, 2012

(65) Prior Publication Data

US 2013/0014056 A1 Jan. 10, 2013

Related U.S. Application Data

(63) Continuation of application No. PCT/EP2010/006989, filed on Nov. 17, 2010.

(30) Foreign Application Priority Data

Dec. 17, 2009 (DE) .......................... 10 2009 058 727

(51) Int. Cl.
*G06F 3/048* (2013.01)
*H04M 1/2745* (2006.01)
(Continued)

(52) U.S. Cl.
CPC ..... *H04M 1/274525* (2013.01); *G01C 21/3611* (2013.01); *G06F 3/0482* (2013.01); *H04M 1/6075* (2013.01)
USPC ............................ 715/810; 715/843; 715/841

(58) Field of Classification Search
CPC ............... G06F 3/0482; G06F 3/0481; H04M 1/247525; G01C 21/3611
USPC .......................................... 715/810, 843, 841
See application file for complete search history.

(56) References Cited

U.S. PATENT DOCUMENTS 6,424,363 B1    7/2002    Matsuba et al.
6,745,140 B2 *  6/2004    Sutton ............................. 702/67
(Continued)

FOREIGN PATENT DOCUMENTS

DE    199 34 190 A1    3/2000
DE    103 05 168 A1    8/2004
(Continued)

OTHER PUBLICATIONS

Corresponding International Search Report with English Translation dated Mar. 24, 2011 (four (4) pages).
(Continued)

*Primary Examiner* — David Phantana Angkool
(74) *Attorney, Agent, or Firm* — Crowell & Moring LLP (57) ABSTRACT

A method of operating a display device of a vehicle is provided on which information is representable in list form with a number of list entries, while the display device size is given and the type and font size are predefined. Each list entry has a second number of maximally representable characters. For the first number of list entries currently to be represented on the display device, it is determined whether, in each case, two mutually successive list entries each have a number of characters that is greater than the second representable number. In the affirmative case, the representable second number of characters of the mutually successive list entries is compared with respect to distinctiveness. When an indistinctiveness is determined, a distinctiveness of these two list entries will be established on the display.

17 Claims, 5 Drawing Sheets

(51) Int. Cl.
*G01C 21/36* (2006.01)
*G06F 3/0482* (2013.01)
*H04M 1/60* (2006.01)

(56) References Cited

U.S. PATENT DOCUMENTS

| | | | | |
|---|---|---|---|---|
| 7,073,133 | B2* | 7/2006 | Hughes et al. | 715/765 |
| 7,216,298 | B1* | 5/2007 | Ballard et al. | 715/760 |
| 7,310,782 | B2* | 12/2007 | Buchanan et al. | 715/815 |
| 8,005,873 | B2* | 8/2011 | Folting et al. | 707/803 |
| 2007/0033545 | A1* | 2/2007 | Haynes et al. | 715/810 |
| 2007/0132789 | A1* | 6/2007 | Ording et al. | 345/684 |
| 2008/0034289 | A1* | 2/2008 | Doepke et al. | 715/700 |
| 2008/0168384 | A1* | 7/2008 | Platzer et al. | 715/784 |
| 2008/0205205 | A1 | 8/2008 | Chiang et al. | |
| 2008/0266298 | A1 | 10/2008 | Hess et al. | |
| 2009/0070711 | A1* | 3/2009 | Kwak et al. | 715/829 |
| 2009/0073194 | A1* | 3/2009 | Ording | 345/672 |
| 2009/0254866 | A1* | 10/2009 | Kugle et al. | 715/841 |
| 2011/0061010 | A1* | 3/2011 | Wasko | 715/769 |
| 2013/0222312 | A1* | 8/2013 | Wilson et al. | 345/173 |

FOREIGN PATENT DOCUMENTS

| | | |
|---|---|---|
| DE | 10 2006 052 663 A1 | 5/2008 |
| DE | 10 2007 046 714 A1 | 4/2009 |
| EP | 1 832 846 A1 | 9/2007 |
| EP | 1 988 363 A2 | 11/2008 |
| JP | 10-301929 A | 11/1998 |
| WO | WO 2006/067541 A1 | 6/2006 |
| WO | WO 2007/021038 A1 | 2/2007 |

OTHER PUBLICATIONS

German Search Report with English Translation dated Jun. 13, 2012 (nine (9) pages).
International Preliminary Report on Patentability (PCT/IB/338 & PCT/IB/373) dated Jul. 20, 2012 (two (2) pages).
Written Opinion (PCT/ISA/237) dated Mar. 24, 2011 (five (5) pages).

* cited by examiner

METHOD AND PROCESS FOR REPRESENTING INFORMATION ON A DISPLAY DEVICE OF A VEHICLE

BACKGROUND AND SUMMARY OF THE INVENTION

The invention relates to a method for representing information on a display device of a vehicle, on which the information can be represented in the form of a list, while the size of the display device is given and the type and size of the font are predefined, by means of a first number of list entries, each list entry having a second number of maximally representable characters. The invention further relates to a processor for controlling a display device of a vehicle.

Display devices of a vehicle have the basic problem that only a limited display area for representing the information is available for the list representation of telephone book entries, multimedia databases, navigation entries, etc. As a result of legal requirements and self-imposed regulations of the manufacturers of vehicles, information represented in text form should have a minimum size. Furthermore, the texts should not be animated, i.e. be displayed as moving texts.

In the case of list entries having a number of characters which is greater than the number of characters that can be represented in a line, it is sometimes problematic that several list entries with the same beginning can no longer be differentiated. This is illustrated in the example shown in FIG. 1. It shows a display area of a display device ANZ, for example, of a central video screen in the vehicle (so-called MMI of the head unit), a display in the instrument cluster, a head-up display or video screens in the rear seat area, in which, for example, six list entries L1, L2, L3, L4, L5, L6 of a telephone list are represented. For example, a number of approximately 20 representable characters Z can be displayed for each list entry. The number of list entries as well as the number of characters per list entry depends on the size of the display area of the display device ANZ and the type and size of the font.

Figure 1:
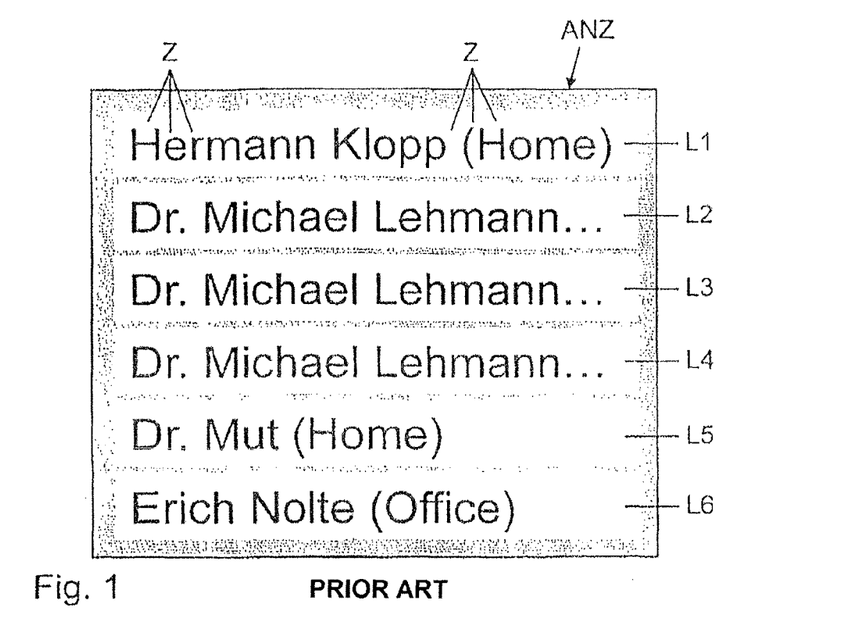
FIG. 1 is a view of the display area of a display device with a number of list entries of which only a fraction can be clearly identified.

As easily recognizable in FIG. 1, three list entries L2, L3, L4 are represented for "Dr. Michael Lehmann". By " . . . " following the name, it is visualized to the user of the display device that additional information follows the name. In the present embodiment, three different telephone numbers are available for Dr. Michael Lehmann: In list entry L2, the number of a mobile telephone ("(Mobile)"), for list entry L3, a private telephone number ("(Home)") and for list entry L4, a business telephone number ("(Office)"). Because of the shortness of the names, the list entries L1 for "Herrmann Klopp (Home)", the list entry L5 for "Dr. Mut (Home)" and the list entry L6 for "Erich Nolte (Office)" are easily readable. However, the selection of a searched telephone book entry for "Dr. Michael Lehmann" is not easily possible for a user of a vehicle, particularly during the drive.

The same problems exist in a similar manner also when representing artists and music titles in the case of MP3 audio databases, in the case of navigation addresses, internet addresses or in the case of operating instructions, etc.

Figure 2:
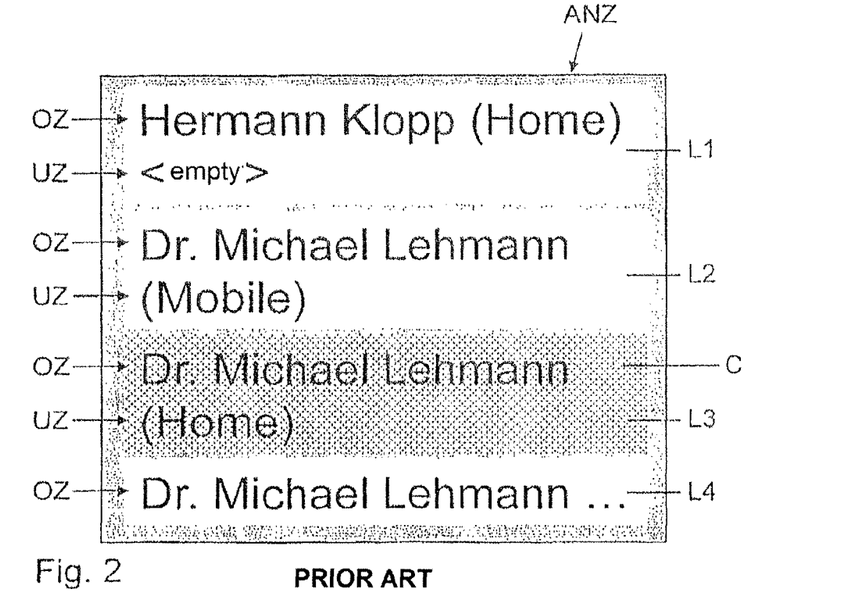
FIG. 2 is a view of a first known variant for the combined representation of the complete information on the display area of the display device.
Figure 3:
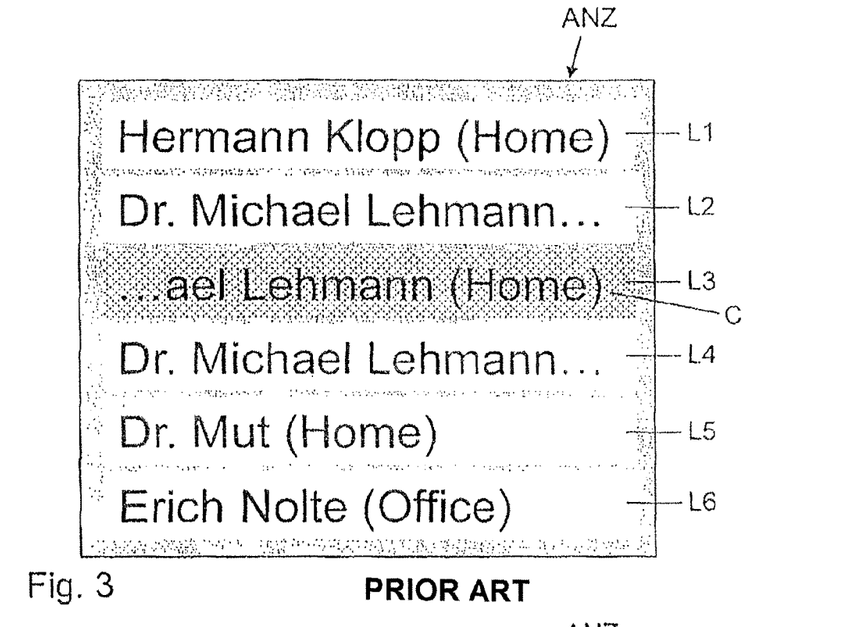
FIG. 3 is a view of a second known variant for the representation of the complete information on the display area of the display device.
Figure 4:
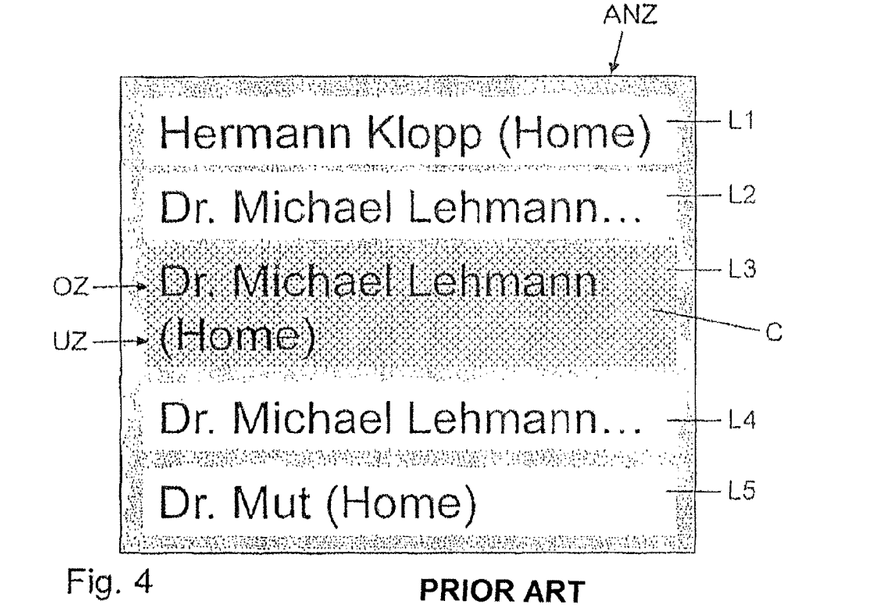
FIG. 4 is a view of a third known variant for the representation of the complete information on the display area of the display device.

In order to nevertheless enable the user to differentiate between the list entries, the following solutions are known which are illustrated in FIGS. 2 to 4.

According to the variant illustrated in FIG. 2, the list entries are generally represented in several lines if at least one list entry has a larger number of characters than the characters that can be represented in the display area. In the embodiment of FIG. 2, two lines OZ, UZ respectively are provided for each list entry L1, L2, L3, L4. Among other things, this has the result that an empty line is generated in the case of such list entries which per se can be completely represented in one line. This is illustrated as an example for list entry L1. However, because of the limited available number of lines, this representation is very confusing because, compared to the one-line list representation, a smaller number of list entries can be visualized.

FIG. 3 illustrates a known list entry end jump of the actively selected list entry. This approach is also called "flipping". In the embodiment, list entry L3, which has a grey background and is marked C, is actively selected by an operating element of the display device ANZ. As soon as the list entry has been selected, the character sequence of the list entry is represented from the direction of the end, whereby the beginning of the character sequence of the list entry L3 is hidden. This is represented by the introductory " . . . ". This representation has the disadvantage that an active selection of the list entry is necessary for the visualization of the complete information of the list entry. If several list entries are successively selected by a user of the display device, this will lead to unsteady jump effects in the case of the respectively actively selected list entries, which are undesirable in a vehicle.

FIG. 4 illustrates a so-called dynamic multiple-line feature of an actively selected list entry. List entry L3, which has a gray background and is marked by a C, is selected again. As a result the information of the list entry is represented on multiple lines if the number of characters of the list entry is greater than the number of characters that can be represented on the display area. The disadvantage of jump effects will also occur here if the user successively selects a plurality of list entries. Furthermore, the user does not obtain a complete overview of the currently represented list entries because only the actively selected list entry will be readable.

It is therefore an object of the present invention to provide a method by which information can be represented in an improved manner on a display device of a motor vehicle, so that, with only minimal distraction, the driver can very clearly see the list entries. It is a further object of the present invention to provide a processor which permits an optimized controlling of a display device of a motor vehicle.

The invention provides a method for representing information on a display device of a vehicle, on which the information can be represented in the form of a list, while the size of the display device is given and the type and size of the font are predefined, by a first number of list entries, each list entry having a second number of maximally representable characters. For the first number of list entries currently to be represented on the display device, it is determined whether, in each case, two mutually successive list entries each have a number of characters that is greater than the second representable number of the respective list entry. In the affirmative case, i.e. when two mutually successive list entries cannot be represented completely on a respective line of the display device, the representable second number of characters of the mutually successive list entries is compared with respect to its distinctiveness. In the event of an indistinctiveness of the two mutually successive list entries that currently are to be represented on the display device, a distinctiveness of these two list entries will be established.

The invention is based on the principle that an optimization of the representation of one or more list entries is to be carried out only if required, i.e. if two or more mutually successive list entries are no longer distinguishable in the area of their visible sequence of characters. This reduces the driver's distraction because, if the size of the display device is given and the type and font are given, more information (i.e., list entries) with a good readability, can be represented, compared with the above described known display variants.

By means of the method according to the invention, differentiating information is thereby created, while space is limited, where this is required because of the information to be represented.

Advantageously, a change of the representation of respective list entries takes place only in the case of those list entries where an indistinctiveness is represented with respect to at least two mutually successive list entries currently to be represented on the display device. In other words, this means that, in the case of two mutually successive list entries where distinctiveness exists in the area of the second number of characters, no change of the display takes place of at least one of the list entries. As a result, an optimization of the list entries to be represented is ensured that meets the requirements.

Indistinctiveness exists when a syntactic distinctiveness of a given type exists in the area of the second number of characters of the mutually successive list entries. This is so, for example, when a single character that does not change the meaning or pronunciation of the represented word is different. As an alternative, indistinctiveness is present if a semantic distinctiveness exists in the area of the second number of characters of mutually successive list entries. The semantic distinctiveness is based on whether or not a word to be represented on the display device is understandable. This creates a better overview over the list entries represented in the list.

A further development provides that, for establishing the distinctiveness of the list entries that follow one another and cannot be distinguished in the area of the second number of characters, these concerned list entries are changed in their representation. Thus, independently of whether a, or which, list entry is selected, an optimization of all visible indistinguishable list entries will take place.

For example, in a variant, the concerned list entries are in each case represented in a multiple-line fashion.

In an alternative variant, at least some of the concerned list entries are represented in an abbreviated form. For abbreviating the concerned list entries, a respective list entry is divided into an indistinguishable character sequence and a distinguishable character sequence, at least the indistinguishable character sequence not being represented at least partially. In other words, this means that identical redundant information is at least partially omitted in the representation. Instead, the distinguishable part of the character sequence will be represented.

The represented character sequence advantageously comprises whole words or semantically understandable words. The abbreviated representation of a list entry may also be such that meaningful abbreviations of a word or a word sequence are selected. For example, the word "Bahnhof" (train station) can be abbreviated to "Bhf". Likewise, an abbreviation of the word "Straße" (street) to "Str." is easily understandable for a user. A corresponding list of abbreviations could be used for this purpose which is stored in the vehicle or in a central memory to be reached by way of on-line access.

In a further advantageous development, an actively selected list entry of the indistinguishable list entries is represented in a multiple-line fashion. This means that a list entry abbreviated according to the preceding description is represented in its entirety as soon as this list entry becomes an actively selected list entry.

In another variant, for establishing the distinctiveness of the mutually successive list entries that are indistinguishable in the area of the second number of characters, the respectively actively selected list entry is changed in its representation, i.e. with respect to the other indistinguishable list entry or entries. In this case, the dynamic optimization becomes active only on the respectively actively selected list entry.

According to a first variant, the actively selected list entry can be represented in a multiple-line fashion. In particular, the list entries to be represented after the actively selected list entry are displaced downward by the space required for the multiple-line feature of the actively selected list entry. A less active display is obtained if the actively selected list entry fades over the list entry or entries that follow.

Likewise, the actively selected list entry can be represented in an abbreviated form in the manner described above. It is also contemplated that the actively selected list entry jumps to the end of the list entry, which corresponds to the initially described "flipping".

A processor according to the invention for controlling a display device of a vehicle is equipped for implementing the method according to the invention.

The invention will be explained in the following by means of embodiments.

DETAILED DESCRIPTION OF THE DRAWINGS

The method for the representation of information on a display device of a vehicle, on which the information can be represented in the form of a list, is based on making the list entries distinguishable only if required; i.e., if the list entries cannot be distinguished from one another without any active assistance. For this purpose, it is determined, with respect to the number of list entries to be currently represented on the display device, whether two mutually successive list entries each have a number of characters that is greater than the representable number of the concerned list entry. If this is so, the characters of the mutually successive list entries are compared with regard to their indistinctiveness. If an indistinctiveness of the two mutually successive list entries to be currently represented on the display device is determined in the area of the representable number of characters of the list entries, a distinctiveness of these two list entries will be established. It is understood that this comparison of pairs of mutually successive list entries is made for all, in each case, mutually successive two list entries, at least for the number of list entries to be represented or for the entire list.

A change of the representation of respective list entries therefore takes place only in the case of those list entries where indistinctiveness is determined in the case of two mutually successive list entries to be currently represented on the display device. This means that, if a list entry can be recognized in its entirety in the display area of the display device, this list entry will in no case be changed with respect to its display.

In a simplest variant, a change of the type of representation of indistinguishable list entries will take place if a syntactic distinctiveness exists in the area of the representable number of characters of the mutually successive list entries.

When the present description speaks of an "area of the representable number of characters", this should be understood to mean that these are those characters that begin with the first character of the sequence of characters of the list entry. A further improved type of differentiation of indistinguishable, mutually successive list entries will be made possible if an analysis takes place with respect to a semantic distinctiveness.

Figure 5:
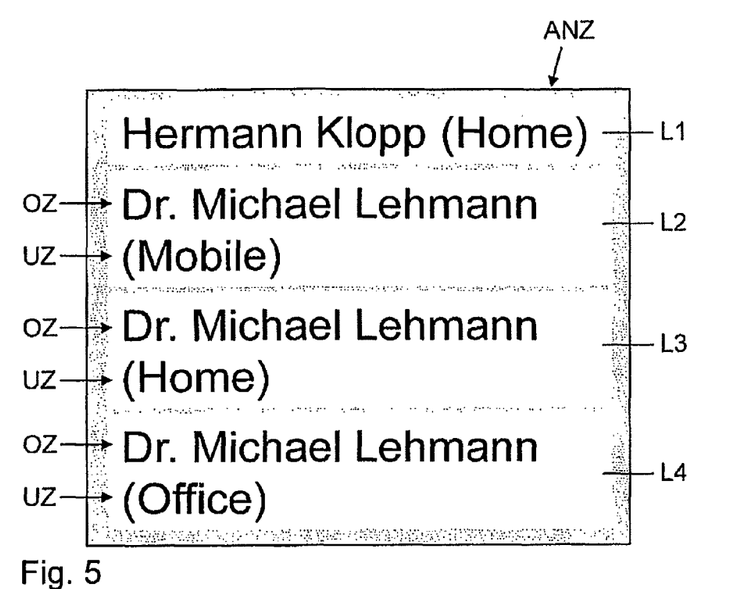
FIG. 5 is a view of a first variant according to the invention for the representation of information present in list form, according to which mixed single- and multiple-line list entries are represented.

FIG. 5 illustrates a first embodiment, in which, irrespective of whether or which list entry is actively selected, an optimization to all list entries L1, L2, L3, L4 represented in the display area of the display device ANZ takes place. In the embodiment illustrated in FIG. 5, those list entries (here: L2, L3, L4) are represented in a multiple-line fashion which, because of their character length, cannot be represented in a single line. Since the list entry "Herrmann Klopp (Home)" can be represented within one line in its entirely, it continues to be represented in a single line. In contrast, the list entries L2, L3, L4 require an additional line for their complete representation, so that they are each represented in a two-line fashion, with an upper line OZ and a lower line UZ. The advantage of this approach consists of the fact that, in comparison to the approach illustrated in FIG. 2, a larger number of list entries can be represented, while simultaneously the readability for the user of the display device ANZ is good.

Figure 6:
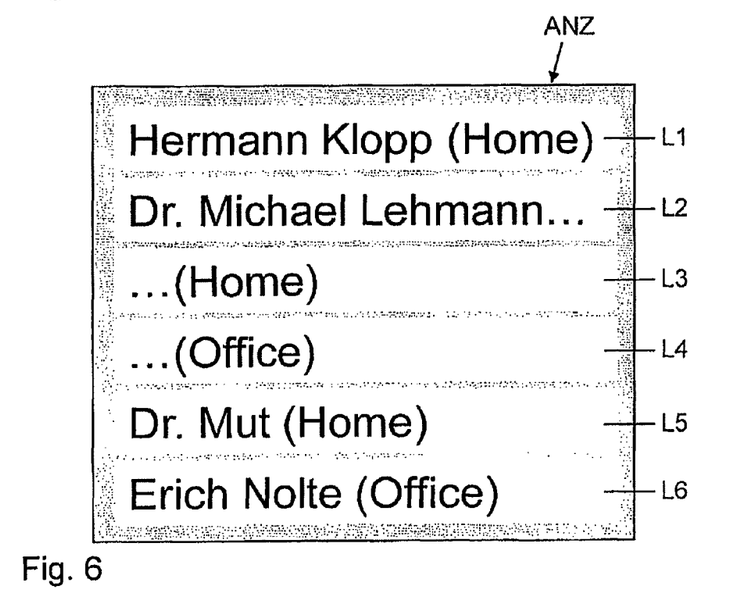
FIG. 6 is a view of a second embodiment for the representation of information, according to which a text length abbreviation is carried out in the case of some list entries.

In the embodiment illustrated in FIG. 6, the differentiation of the information in the case of a maximal number of list entries is achieved in that a text length abbreviation takes place. The text length abbreviation concerns the list entries L2, L3, L4. In the case of line entries L3, L4, identical information represented in line entry L2 is omitted, while the characters that are meaningful for a differentiation are represented. By means of the preceding dots (" . . . "), it is signaled to the user that only a partial section of the complete line entry is represented. The text length abbreviation is preferably carried out such that whole words will remain in order to keep comprehensibility at a high level. If required, a separation may also be meaningful within a word, for example, when a long word is provided with typical separation symbols, such as "_", "-", ".", etc. In order to further increase the comprehensibility and differentiation of the list entries, list entry L2, which represents only partial information of the entire list entry, could, in addition, also be presented in two or more lines.

For example, identical character sequences of mutually successive list entries may also be represented in a smaller form, while differentiating character sequences may be represented in a larger form or in the standard size.

Figure 7:
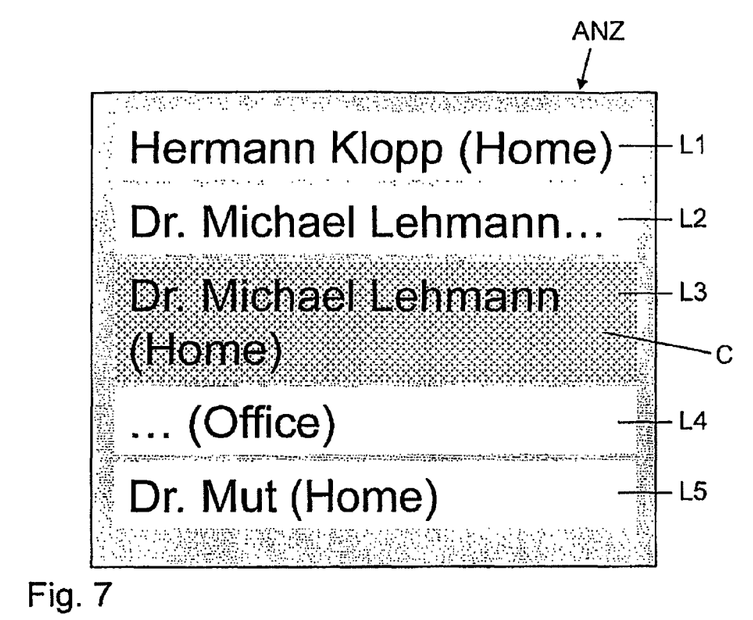
FIG. 7 is a view of a third variant according to the invention for the representation of information, according to which a dynamic multi-line feature is provided.
Figure 8:
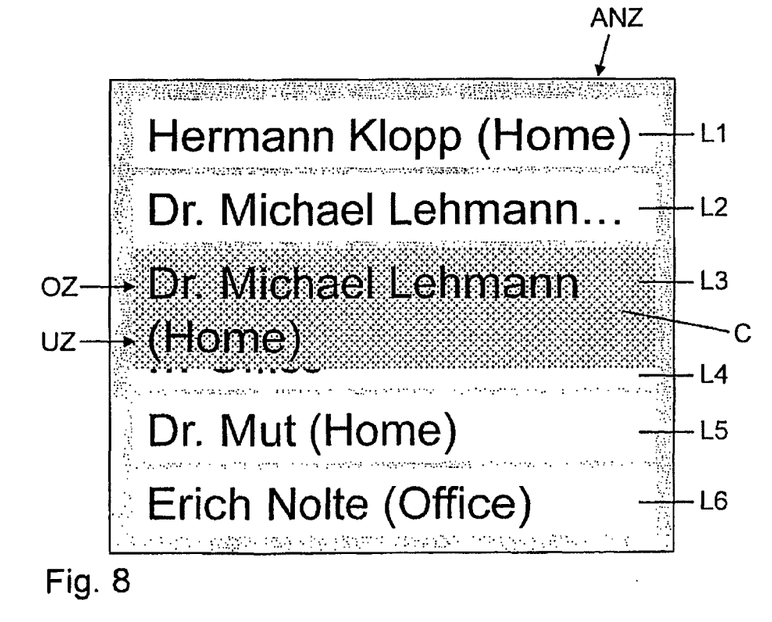
FIG. 8 is a view of a fourth variant according to the invention for the representation of information, according to which a dynamic multi-line feature is provided.
Figure 9:
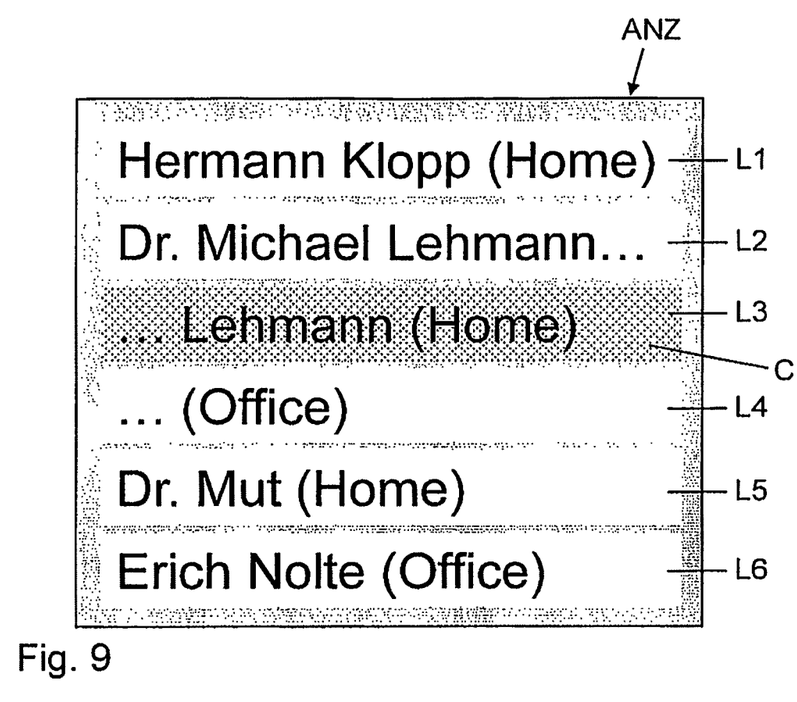
FIG. 9 is a view of a fifth embodiment, according to which an actively selected list entry is visualized by a word end jump.

The embodiments illustrated in FIGS. 7 to 9 use a so-called dynamic optimization of the list entries. This means that, with respect to the above description, a further optimization of the display of a list entry takes place when the corresponding list entry is actively selected.

Although distinctiveness exists in the case of list entries L2, L3, L4 in the embodiment of FIG. 7, a user may want to obtain more exact information concerning a list entry. List entry L3, which has a gray background and is marked C, is to be the actively selected list entry that is of interest to the user. In this case, list entry L3 is represented in multiple lines. List entries L4, L5, etc., which follow list entry L3, are displaced downward, whereby the total number of represented list entries is reduced by 1 in the embodiment.

Since the displacement of the list entries following an actively selected list entry results in a busy display, it is provided according to the embodiment of FIG. 8 that the actively selected list entry (here again list entry L3) fades over or covers the list entry (entries) that follows (follow). As a result, no displacement takes place of the list entries that follow list entry L3, whereby the display remains less active (quieter) and results in less distraction.

FIG. 9 illustrates the embodiment in which the actively selected list entry (here, L3, again with a gray background and marked C) jumps to the end of the list entry. This approach is called "flipping".

Likewise, the dynamic optimization may comprise the above-explained intelligent text length abbreviation. In particular, it may be provided in this case that an actively selected list entry of the indistinguishable and abbreviated list entries will then be represented in a multiple-line fashion, in order to provide the user with the complete information after the selection of the list entry. Likewise, the text length abbreviation may be combined with a jump to the beginning of the list entry.

LIST OF REFERENCE SYMBOLS

ANZ Display area of the display device
L1 List entry
L2 List entry
L3 List entry
L4 List entry
L5 List entry
L6 List entry
Z Character
C Actively selected list entry

The invention claimed is:

1. A method for representing information on a display device of a vehicle, on which the information is representable in a form of a list having a first number of list entries, wherein a size of the display device is given and a type and size of a font are predefined, each list entry having a second number of maximally representable characters, the method comprising the acts of:
   for the first number of list entries currently to be represented on the display device, determining whether, in each case, two mutually successive list entries each have a number of characters that is greater than the second maximally representable number of characters of the respective list entry;
   in an affirmative case, comparing the second maximally representable number of characters of the mutually successive list entries with respect to distinctiveness;
   when an indistinctiveness of the two mutually successive list entries to be currently represented on the display device is determined, establishing on the display device a distinctiveness of the two mutually successive list entries, and wherein, for establishing the distinctiveness of the list entries that follow one another and cannot be distinguished in the area of the second number of characters, the concerned list entries are changed in their representation.

2. The method according to claim 1, wherein a change of the representation of respective list entries takes place only in the case of those list entries where an indistinctiveness is determined with respect to at least two mutually successive list entries currently to be represented on the display device.

3. The method according to claim 2, wherein indistinctiveness may still exist when a syntactic distinctiveness of a given type exists in the area of the second number of characters of the mutually successive list entries.

4. The method according to claim 2, wherein indistinctiveness may still exist when a semantic distinctiveness exists in the area of the second number of characters of mutually successive list entries.

5. The method according to claim 1, wherein the concerned list entries are each representable in a multiple-line fashion.

6. The method according to claim 5, wherein at least some of the concerned list entries are representable in an abbreviated fashion.

7. The method according to claim 6, wherein, for abbreviating the concerned list entries, a respective list entry is divided into an indistinguishable character sequence and a distinguishable character sequence, at least a portion of the indistinguishable character sequence not being represented.

8. The method according to claim 7, wherein the represented character sequence comprises whole words or semantically differentiating word components.

9. The method according to claim 6, wherein an actively selected list entry of the indistinguishable list entries is represented by one of: a multiple-line manner and a jump to a beginning of a list entry.

10. The method according to claim 1, wherein at least some of the concerned list entries are representable in an abbreviated fashion.

11. A processor for controlling a display device of a vehicle, the processor being operatively configured to carry out the method of claim 1.

12. A method for representing information on a display device of a vehicle, on which the information is representable in a form of a list having a first number of list entries, wherein a size of the display device is given and a type and size of a font are predefined, each list entry having a second number of maximally representable characters, the method comprising the acts of:

for the first number of list entries currently to be represented on the display device, determining whether, in each case, two mutually successive list entries each have a number of characters that is greater than the second maximally representable number of characters of the respective list entry;

in an affirmative case, comparing the second maximally representable number of characters of the mutually successive list entries with respect to distinctiveness;

when an indistinctiveness of the two mutually successive list entries to be currently represented on the display device is determined, establishing on the display device a distinctiveness of the two mutually successive list entries, and wherein a change of the representation of respective list entries takes place only in the case of those list entries where an indistinctiveness is determined with respect to at least two mutually successive list entries currently to be represented on the display device, and wherein, for establishing the distinctiveness of the mutually successive list entries that are indistinguishable in the area of the second number of characters, a respectively actively selected list entry is changed in its representation.

13. The method according to claim 12, wherein the actively selected list entry is represented in a multiple-line fashion.

14. The method according to claim 13, wherein the list entries to be represented after the actively selected list entry are displaced downward by a space required for the multiple-line feature of the actively selected list entry.

15. The method according to claim 13, wherein the actively selected list entry fades over the following list entry or entries.

16. The method according to claim 12, wherein the actively selected list entry is represented in an abbreviated fashion.

17. The method according to claim 12, wherein the actively selected list entry jumps to an end of the list entry.

\* \* \* \* \*